UNITED STATES PATENT OFFICE 2,068,197

PRODUCTION OF BETA-BRAZIN-5,11-DIONE

Curt Schuster and Franz Broich, Ludwigshafen-on-the-Rhine, Germany, assignors to General Aniline Works, Inc., New York, N. Y., a corporation of Delaware No Drawing. Application September 28, 1934, Serial No. 746,011. In Germany October 7, 1933

6 Claims. (Cl. 260—54)

The present invention relates to a new quinonic body and a process of producing same.

We have found that a new quinonic body which may be employed as valuable initial material for the preparation of dyestuffs and the like can be obtained by treating beta-naphthylenephenylene oxide of the formula

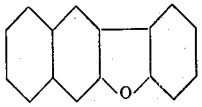

with an oxidizing agent.

The oxidation may be carried out for example by treatment with chromic anhydride or with alkali metal bichromate dissolved in glacial acetic or with oxides of nitrogen. The oxidation may also be effected catalytically for example by leading a mixture of vaporized beta-naphthylenephenylene oxide with oxygen or air at temperatures between from 250° to 550° C. over an oxygen-transporting catalyst for example vanadium oxide or iron vanadate.

The quinonic body obtained, which probably corresponds to the formula

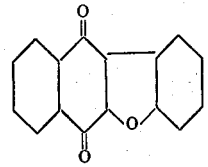

is an intense yellow substance having a melting point of from 239° to 240° C. which crystallizes from glacial acetic acid in fine needles. It dissolves in concentrated sulphuric acid giving a deep violet-red coloration and yields a golden yellow vat. It dissolves in caustic soda solution giving a brown-red coloration and is precipitated unchanged from the solution by acidification. Distillation with zinc dust leads to beta-naphthylenephenylene oxide which melts at 202° C. When suspended in methanol and treated at ordinary temperature with hydrogen under pressure in the presence of a suitable catalyst, the quinone is reduced to the corresponding hydroquinone which crystallizes from alcohol in white leaflets. The hydroquinone is rapidly oxidized back to the quinone when exposed to the air. When the hydroquinone is boiled with acetic anhydride it yields the corresponding diacetate; this forms white needles having a melting point of 246° C. when crystallized from glacial acetic acid. When the quinone is distilled with zinc dust, it is reconverted into beta-naphthylenephenylene oxide.

By introducing substituents into the quinone, as for example by nitration, halogenation or sulphonation, derivatives are obtained which may be employed for further reactions. Thus the nitro derivatives may be reduced to the corresponding amino derivatives which may also be converted, as for example by diazotization, alkylation, aralkylation or acylation. The halogen derivatives yield imides when reacted with amines. By treatment with sulphonating agents under varying conditions and with various additions, sulphonic acids of the quinone or sulphonic acids of hydroxyquinones or the hydroxyquinones themselves may be obtained.

The following examples will further illustrate the nature of this invention but the invention is not restricted to these examples. The parts are by weight.

Example 1

5 parts of beta-naphthylenephenylene oxide are dissolved in 300 parts of glacial acetic acid at from 60° to 70° C. Into the resulting solution there is allowed to flow during the course of an hour a solution of 20 parts of chromic anhydride in a mixture of 20 parts of water and 20 parts of glacial acetic acid at such a rate that the temperature remains at from 60° to 70° C. without any external supply of heat. The whole is then kept at from 60° to 70° C. for about half an hour while stirring. It is then poured into five times the amount of water, filtered by suction, washed and dried.

Example 2

Beta-naphthylenephenylene oxide vapor is led in a vigorous current of air at 450° C. over a catalyst of iron vanadate. The quinone formed separates in the receiver in the form of yellow needles. It may be freed from unconverted initial material by vatting.

Example 3

A higher oxide of nitrogen is led into a solution of beta-naphthylenephenylene oxide in glacial acetic acid at room temperature until the solution is saturated. The solution is allowed to stand for twelve hours and is then concentrated. A mixture is formed which consists of the corresponding quinone and its nitration product.

What we claim is:—

1. The process of producing beta-brazin-5,11- dione which comprises treating beta-naphthylenephenylene oxide with an oxidizing agent selected from the group consisting of the oxidizing compounds of chromium, oxygen and the higher oxides of nitrogen.

2. The process of producing beta-brazin-5,11-dione which comprises treating beta-naphthylenephenylene oxide with an oxidizing compound derived from chromium in the presence of an organic diluent.

3. The process of producing beta-brazin-5,11-dione which comprises treating beta-naphthylenephenylene oxide with chromic anhydride in the presence of glacial acetic acid.

4. The process of producing beta-brazin-5,11-dione which comprises treating beta-naphthylenephenylene oxide with alkali metal bichromate in the presence of glacial acetic acid.

5. The process of producing beta-brazin-5,11-dione which comprises leading at temperatures of between 250° to 550° C. a mixture of vaporized beta-naphthylenephenylene oxide and oxygen over an oxygen-transporting catalyst.

6. Beta-brazin-5,11-dione having the formula

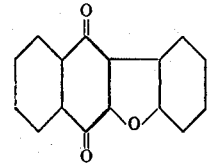

which melts at from 239 to 240° C., is converted by distillation with zinc dust into beta-naphthylenephenylene oxide melting at 202° C., dissolves in concentrated sulphuric acid giving a deep violet-red coloration and in caustic soda solution giving a brown-red coloration and yields a golden yellow vat.

CURT SCHUSTER.
FRANZ BROICH.